US005961382A

United States Patent [19]

Stoloski

[11] Patent Number: 5,961,382

[45] Date of Patent: Oct. 5, 1999

[54] PIPE BEVELER

[76] Inventor: Mark Stoloski, 2660 W. Cabrillo Hwt, Half Moon Bay, Calif. 94019

[21] Appl. No.: 08/897,897

[22] Filed: Jul. 21, 1997

[51] Int. Cl.[6] ........................................ B23F 21/03

[52] U.S. Cl. ........................ 451/541; 451/462; 451/180

[58] Field of Search .............................. 451/462, 180, 451/541

[56] References Cited

U.S. PATENT DOCUMENTS 3,200,540 8/1965 Lavallee .............................. 451/180

3,290,834 12/1966 Lindblad .............................. 451/541

4,063,471 12/1977 Nowak .............................. 76/112

*Primary Examiner*—David A. Scherbel

*Assistant Examiner*—Shantese McDonald

[57] ABSTRACT

A new PIPE BEVELER for ATTACHING TO A ROTARY SAW FOR PRODUCING THIRTY DEGREE BEVELS ON PIPES. The inventive device includes a coupling plate adapted for coupling with respect to a rotary saw. A receiving collar having a generally frustoconical configuration is integral with the coupling plate. An abrasive material is disposed around an internal periphery of the receiving collar for grinding pipes into a bevel of thirty degrees.

11 Claims, 2 Drawing Sheets

PIPE BEVELER

BACKGROUND OF THE INVENTION

1. Field of the Invention

The present invention relates to PIPE BEVELING DEVICES and more particularly pertains to a new PIPE BEVELER for ATTACHING TO A ROTARY SAW FOR PRODUCING THIRTY DEGREE BEVELS ON PIPES.

2. Description of the Prior Art

The use of PIPE BEVELING DEVICES is known in the prior art. More specifically, PIPE BEVELING DEVICES heretofore devised and utilized are known to consist basically of familiar, expected and obvious structural configurations, notwithstanding the myriad of designs encompassed by the crowded prior art which have been developed for the fulfillment of countless objectives and requirements.

Known prior art PIPE BEVELING DEVICES include U.S. Pat. No. 4,180,358 to Uribe; U.S. Pat. No. 3,951,018 to Gilmore; U.S. Pat. No. 4,114,485 to Coblitz et al.; U.S. Pat. No. 3,872,748 to Bjalme; U.S. Pat. No. 4,550,635 to Kanayama; and U.S. Pat. No. 4,689,883 to Dent.

While these devices fulfill their respective, particular objectives and requirements, the aforementioned patents do not disclose a new PIPE BEVELER. The inventive device includes a coupling plate adapted for coupling with respect to a rotary saw. A receiving collar having a generally frustoconical configuration is integral with the coupling plate. An abrasive material is disposed around an internal periphery of the receiving collar.

In these respects, the PIPE BEVELER according to the present invention substantially departs from the conventional concepts and designs of the prior art, and in so doing provides an apparatus primarily developed for the attaching to a rotary saw for producing thirty degree bevels on pipes of ATTACHING TO A ROTARY SAW FOR PRODUCING THIRTY DEGREE BEVELS ON PIPES.

SUMMARY OF THE INVENTION

In view of the foregoing disadvantages inherent in the known types of PIPE BEVELING DEVICES now present in the prior art, the present invention provides a new PIPE BEVELER construction wherein the same can be utilized for ATTACHING TO A ROTARY SAW FOR PRODUCING THIRTY DEGREE BEVELS ON PIPES.

The general attaching to a rotary saw for producing thirty degree bevels on pipes of the present invention, which will be described subsequently in greater detail, is to provide a new PIPE BEVELER apparatus and method which has many of the advantages of the PIPE BEVELING DEVICES mentioned heretofore and many novel features that result in a new PIPE BEVELER which is not anticipated, rendered obvious, suggested, or even implied by any of the prior art PIPE BEVELING DEVICES, either alone or in any combination thereof.

To attain this, the present invention generally comprises a coupling plate adapted for coupling with respect to a rotary saw. The coupling plate has a generally circular configuration with planar inner and outer surfaces. The coupling plate has a mounting aperture directed therethrough. The mounting aperture is dimensioned for receiving an arbor of the rotary saw. The mounting aperture includes a coupling washer disposed therein. The coupling plate has a peripheral flange extending outwardly therefrom. A receiving collar is provided having a generally frustoconical configuration. The receiving collar has a smaller open inner end and a larger open outer end. The smaller open inner end is integral with the peripheral flange of the coupling plate. The receiving collar angles outwardly thirty degrees from the smaller open inner end to the larger open outer end. The receiving collar has a width greater than twice a width of the peripheral flange. The larger open outer end has a diameter about twice as great as a diameter of the smaller open inner end. The receiving collar has an abutting flange disposed around an interior surface thereof positioned outwardly of the smaller open inner end. An abrasive material is disposed around an internal periphery of the receiving collar. The abrasive material is disposed on the inner surface of the receiving collar disposed between the larger open outer end and the abutting flange.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the attaching to a rotary saw for producing thirty degree bevels on pipes of description and should not be regarded as limiting.

As such, those skilled in the art will appreciate that the conception, upon which this disclosure is based, may readily be utilized as a basis for the designing of other structures, methods and systems for carrying out the several attaching to a rotary saw for producing thirty degree bevels on pipes of the present invention. It is important, therefore, that the claims be regarded as including such equivalent constructions insofar as they do not depart from the spirit and scope of the present invention.

Further, the attaching to a rotary saw for producing thirty degree bevels on pipes of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new PIPE BEVELER apparatus and method which has many of the advantages of the PIPE BEVELING DEVICES mentioned heretofore and many novel features that result in a new PIPE BEVELER which is not anticipated, rendered obvious, suggested, or even implied by any of the prior art PIPE BEVELING DEVICES, either alone or in any combination thereof.

It is another object of the present invention to provide a new PIPE BEVELER which may be easily and efficiently manufactured and marketed.

It is a further object of the present invention to provide a new PIPE BEVELER which is of a durable and reliable construction.

An even further object of the present invention is to provide a new PIPE BEVELER which is susceptible of a low cost of manufacture with regard to both materials and labor, and which accordingly is then susceptible of low prices of sale to the consuming public, thereby making such PIPE BEVELER economically available to the buying public.

Still yet another object of the present invention is to provide a new PIPE BEVELER which provides in the apparatuses and methods of the prior art some of the advantages thereof, while simultaneously overcoming some of the disadvantages normally associated therewith.

Still another object of the present invention is to provide a new PIPE BEVELER for ATTACHING TO A ROTARY SAW FOR PRODUCING THIRTY DEGREE BEVELS ON PIPES.

Yet another object of the present invention is to provide a new PIPE BEVELER which includes a coupling plate adapted for coupling with respect to a rotary saw. A receiving collar having a generally frustoconical configuration is integral with the coupling plate. An abrasive material is disposed around an internal periphery of the receiving collar.

Still yet another object of the present invention is to provide a new PIPE BEVELER that produces exact thirty degree bevel cuts that would allow increased productivity.

Even still another object of the present invention is to provide a new PIPE BEVELER that mounts to an arbor of a conventional saw.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
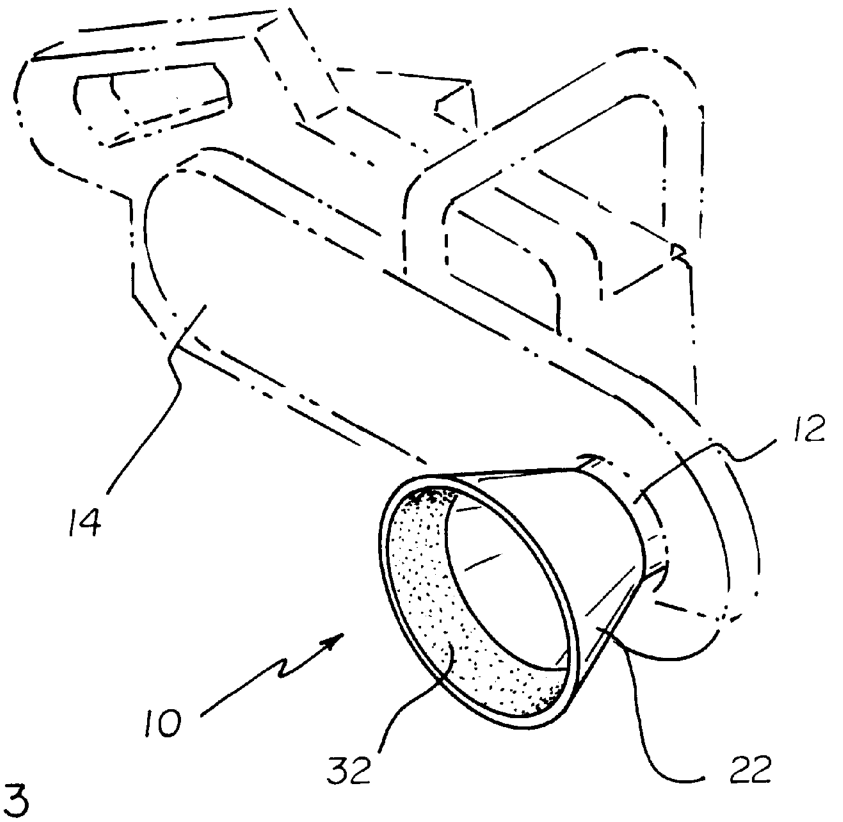
FIG. 1 is a perspective view of a new PIPE BEVELER according to the present invention illustrated secured to a rotary saw.
Figure 2:
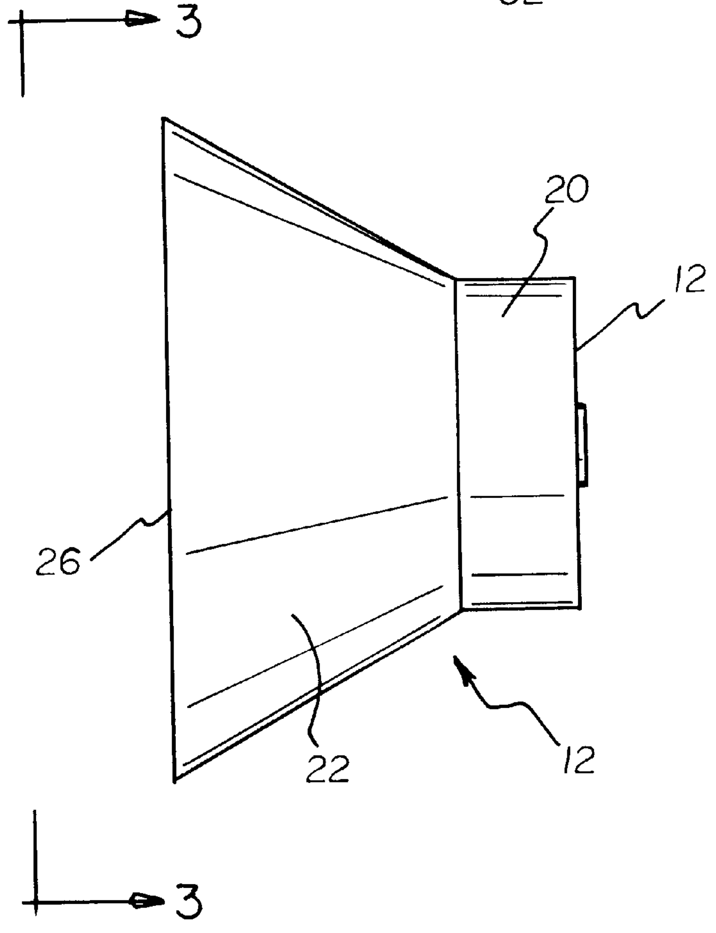
FIG. 2 is a side elevation view of the present invention.
Figure 3:
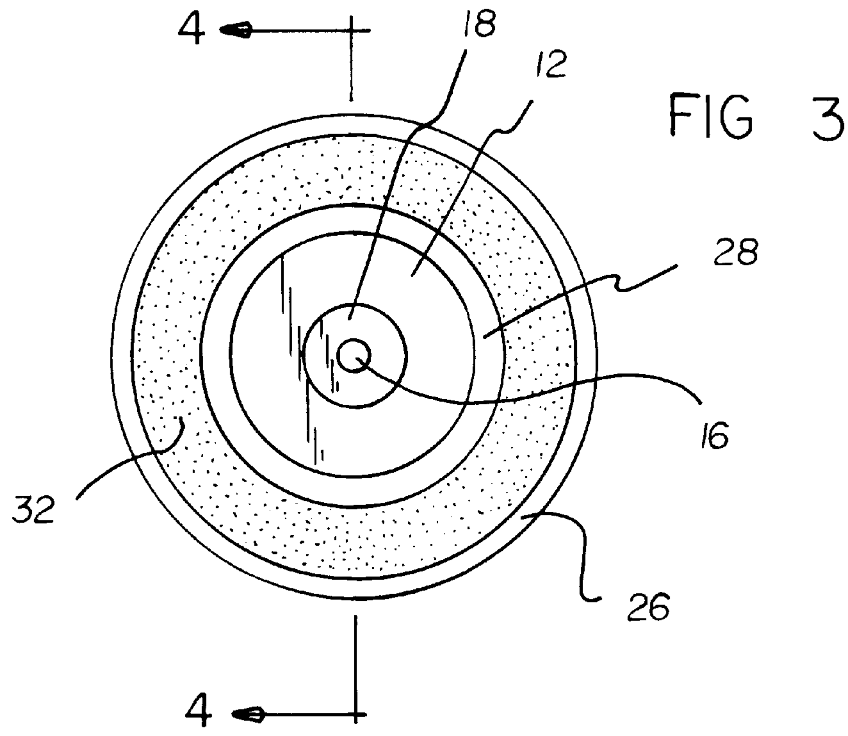
FIG. 3 is a front view of the present invention as taken along line 3—3 of FIG. 2.
Figure 4:
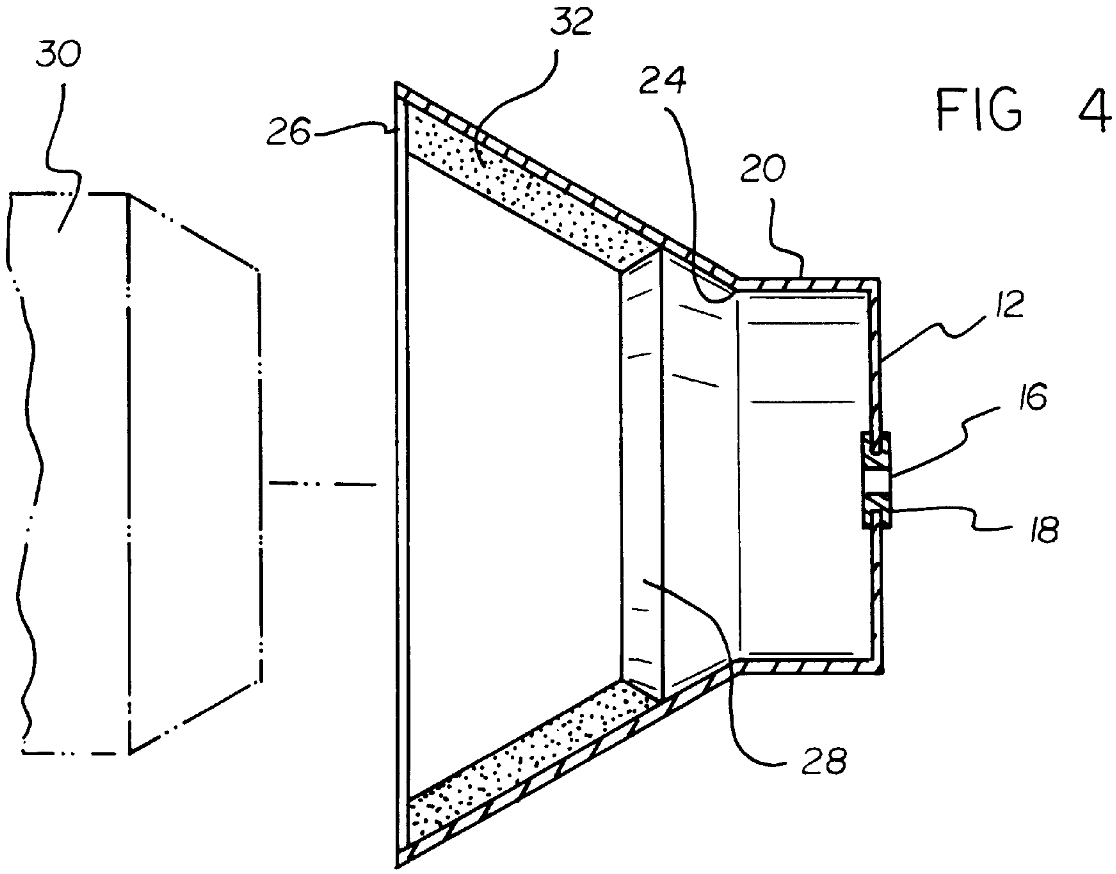
FIG. 4 is a cross-sectional view as taken along line 4—4 of FIG. 3.

With reference now to the drawings, and in particular to FIGS. 1 through 4 thereof, a new PIPE BEVELER embodying the principles and concepts of the present invention and generally designated by the reference numeral 10 will be described.

As best illustrated in FIGS. 1 through 4, the PIPE BEVELER 10 comprises a coupling plate 12 adapted for coupling with respect to a rotary saw 14. The coupling plate 12 has a generally circular configuration with planar inner and outer surfaces. The coupling plate 12 has a mounting aperture 16 directed therethrough. The mounting aperture 16 is dimensioned for receiving an arbor of the rotary saw 14. The mounting aperture 16 includes a coupling washer 18 disposed therein. The coupling plate 12 has a peripheral flange 20 extending outwardly therefrom. Alternately, the coupling plate 12 could be incorporated into the construction of a rotary saw whereby the pipe beveler 10 is a complete system. For use on existing rotary saws, a blade guard of the rotary saw might have to be removed depending on the model type.

A receiving collar 22 is provided having a generally frustoconical configuration. The receiving collar 22 has a smaller open inner end 24 and a larger open outer end 26. The smaller open inner end 24 is integral with the peripheral flange 20 of the coupling plate 12. The receiving collar 22 angles outwardly thirty degrees from the smaller open inner end 24 to the larger open outer end 26. The receiving collar 22 has a width greater than twice a width of the peripheral flange 20. The larger open outer end 26 has a diameter about twice as great as a diameter of the smaller open inner end 24. The receiving collar 22 has an abutting flange 28 disposed around an interior surface thereof positioned outwardly of the smaller open inner end 24. The larger open outer end 26 is dimensioned for receiving an end of a pipe 30 therein. Note FIG. 4.

An abrasive material 32 is disposed around an internal periphery of the receiving collar 22. The abrasive material 32 is disposed on the inner surface of the receiving collar 22 disposed between the larger open outer end 26 and the abutting flange 28. The abrasive material 32 is of the type used for grinding ferrous materials. The abrasive material 32 is replaceable once the use of the pipe bevelers 10 wears down the abrasive material 32 to the point where the pipes are not being properly beveled.

In use, the pipe beveler 10 is attached to a rotary saw 14 in order to produce a thirty degree bevel on the outside edge of a pipe employed in water utility and other related applications. The pipe beveler 10 will substantially reduce the amount of time and labor required to produce a bevel on the end of a pipe, preferably less than twelve inches. The pipe beveler 10 will achieve a higher degree of accuracy than present methods, thereby ensuring a good fit between adjoining pipe sections or fittings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe beveler for attaching to a rotary saw for producing thirty degree bevels on an outside edge of a pipe comprising, in combination:

a coupling plate adapted for coupling with respect to a rotary saw, the coupling plate having a generally circular configuration with planar inner and outer surfaces, the coupling plate having a mounting aperture directed therethrough, the mounting aperture dimensioned for receiving an arbor of the rotary saw, the mounting aperture including a coupling washer disposed therein, the coupling plate having a peripheral flange extending outwardly therefrom;

a receiving collar having a generally frustoconical configuration, the receiving collar having a smaller open inner end and a larger open outer end, the smaller open inner end being integral with the peripheral flange of the coupling plate, the receiving collar angling outwardly thirty degrees from the smaller open inner end to the larger open outer end, the receiving collar having a width greater than twice a width of the peripheral flange, the larger open outer end having a diameter about twice as great as a diameter of the smaller open inner end, the receiving collar having an abutting flange disposed around an interior surface thereof positioned outwardly of the smaller open inner end; and an abrasive material disposed around an internal periphery of the receiving collar, the abrasive material disposed on the inner surface of the receiving collar disposed between the larger open outer end and the abutting flange.

2. A pipe beveler comprising:

a coupling plate adapted for coupling with respect to a rotary saw;

a receiving collar having a generally frustoconical configuration being integral with the coupling plate;

the receiving collar having a smaller open inner end and a larger open outer end, the smaller open inner end being positioned towards the coupling plate:

an abrasive material disposed around an internal periphery of the receiving collar;

the receiving collar having an abutting flange disposed around an interior surface thereof positioned towards the smaller open inner end and being for abutting a pipe being beveled for holding the pipe at a constant angle with respect to the receiving collar;

an outer edge of the abutting flange tapering together away from a point of contact with the interior surface of the receiving collar; and the abrasive material being disposed on the inner surface of the receiving collar abutting the outer edge of the abutting flange and extending towards the larger open outer end, the tapered outer end of the abutting flange being angled such that it helps prevent sliding of the abrasive material towards the smaller open end of the receiving collar.

3. The pipe beveler as set forth in claim 2 wherein the coupling plate has a mounting aperture directed therethrough for receiving an arbor of the rotary saw.

4. The pipe beveler as set forth in claim 3 wherein the mounting aperture includes a coupling washer disposed therein.

5. The pipe beveler as set forth in claim 2 wherein the coupling plate has a peripheral flange extending outwardly therefrom.

6. The pipe beveler as set forth in claim 5 wherein the smaller open inner end of the receiving collar is integral with the peripheral flange of the coupling plate.

7. The pipe beveler as set forth in claim 6 wherein the receiving collar angles outwardly thirty degrees from the smaller open inner end to the larger open outer end.

8. The pipe beveler as set forth in claim 6 wherein the receiving collar has a width greater than twice a width of the peripheral flange for permitting reception of pipes of varying diameters.

9. The pipe beveler as set forth in claim 6 wherein the larger open outer end has a diameter about twice as great as a diameter of the smaller open inner end for permitting reception of pipes of varying diameters.

10. The pipe beveler as set forth in claim 6 wherein the abutting flange is positioned outwardly of the smaller open inner end.

11. The pipe beveler as set forth in claim 10 wherein the abrasive material is disposed between the larger open outer end and the abutting flange.

* * * * *